United States Patent
Sawa et al.

(10) Patent No.: US 12,272,819 B2
(45) Date of Patent: Apr. 8, 2025

(54) HYDROGEN STORAGE ALLOY FOR ALKALINE STORAGE BATTERY, ALKALINE STORAGE BATTERY USING THE SAME AS NEGATIVE ELECTRODE, AND VEHICLE

(71) Applicants: JAPAN METALS AND CHEMICALS CO., LTD., Tokyo (JP); TOYOTA JIDOSHA KABUSHIKI KAISHA, Toyota (JP); KABUSHIKI KAISHA TOYOTA JIDOSHOKKI, Kariya (JP)

(72) Inventors: Takao Sawa, Yamagata (JP); Saki Notoyama, Yamagata (JP); Tomoki Souma, Yamagata (JP); Katsuyuki Kudo, Yamagata (JP); Takuya Watanabe, Yamagata (JP); Masato Hozumi, Toyota (JP); Motoyoshi Okumura, Toyota (JP); Masashi Kodama, Toyota (JP); Takuro Kikuchi, Toyota (JP); Takeo Okanishi, Toyota (JP); Atsushi Minagata, Kariya (JP); Shuhei Mochida, Kariya (JP); Hiroyuki Sasaki, Kariya (JP); Satoshi Kono, Kariya (JP)

(73) Assignees: JAPAN METALS & CHEMICALS CO., LTD., Tokyo (JP); TOYOTA JIDOSHA KABUSHIKI KAISHA, Toyota (JP); KABUSHIKI KAISHA TOYOTA JIDOSHOKKI, Kariya (JP)

( * ) Notice: Subject to any disclaimer, the term of this patent is extended or adjusted under 35 U.S.C. 154(b) by 721 days.

(21) Appl. No.: 17/442,927

(22) PCT Filed: Feb. 28, 2020

(86) PCT No.: PCT/JP2020/008332
§ 371 (c)(1),
(2) Date: Sep. 24, 2021

(87) PCT Pub. No.: WO2020/195543
PCT Pub. Date: Oct. 1, 2020

(65) Prior Publication Data
US 2022/0190327 A1 Jun. 16, 2022

(30) Foreign Application Priority Data

Mar. 26, 2019 (JP) ................................. 2019-058381

(51) Int. Cl.
*H01M 4/38* (2006.01)
*B22F 1/00* (2022.01)
(Continued)

(52) U.S. Cl.
CPC ............... *H01M 4/385* (2013.01); *B22F 1/00* (2013.01); *H01M 10/30* (2013.01); *H01M 2004/021* (2013.01); *H01M 2004/027* (2013.01)

(58) Field of Classification Search
CPC ................. H01M 4/385; H01M 10/30; H01M 2004/021; H01M 2004/027; H01M 4/242
See application file for complete search history.

(56) References Cited

U.S. PATENT DOCUMENTS

| 5,935,732 A | 8/1999 | Matsumura et al. |
| 6,130,006 A | 10/2000 | Kohno et al. |

(Continued)

FOREIGN PATENT DOCUMENTS

| CN | 1277464 A | 12/2000 |
| CN | 1739210 A | 2/2006 |

(Continued)

OTHER PUBLICATIONS

Yuan et al., CN105274395 Espacenet machine translation, (Year: 2017).*

(Continued)

*Primary Examiner* — Adam A Arciero
(74) *Attorney, Agent, or Firm* — Oliff PLC (57) ABSTRACT

A hydrogen storage alloy suitable for a negative electrode of an on-board alkaline storage battery, an alkaline storage battery using this hydrogen storage alloy, and a vehicle; wherein a fine-grained hydrogen storage alloy is used for an alkaline storage battery that has a crystal structure of an $A_2B_7$-type structure as a main phase and is represented by a general formula: $(La_{1-a}Sm_a)_{1-b}Mg_bNi_cAl_dCr_e$ (where suffixes a, b, c, d, and e meet the following conditions: $0 \leq a \leq 0.35$, $0.15 \leq b \leq 0.30$, $0.02 \leq d \leq 0.10$, $0 \leq e \leq 0.10$, $3.20 \leq c+d+e \leq 3.50$, and $0 < a+e$), and an alkaline storage battery using (Continued)

this hydrogen storage alloy for a negative electrode. A vehicle also includes this alkaline storage battery as an electricity supply source for a motor.

17 Claims, 3 Drawing Sheets

(51) Int. Cl.
*H01M 4/02* (2006.01)
*H01M 10/30* (2006.01)

(56) References Cited

U.S. PATENT DOCUMENTS

| | | |
|---|---|---|
| 6,444,361 B1 | 9/2002 | Komori et al. |
| 2003/0096164 A1 | 5/2003 | Sakai et al. |
| 2007/0158001 A1 | 7/2007 | Kihara et al. |
| 2008/0299458 A1 | 12/2008 | Yoshida et al. |
| 2009/0061316 A1 | 3/2009 | Yoshida et al. |
| 2009/0087745 A1 | 4/2009 | Ako et al. |
| 2009/0111023 A1 | 4/2009 | Kihara et al. |
| 2009/0155688 A1 | 6/2009 | Endo et al. |
| 2010/0028774 A1 | 2/2010 | Ohyama et al. |
| 2010/0081053 A1 | 4/2010 | Ishida |
| 2010/0323243 A1 | 12/2010 | Yoshida et al. |
| 2011/0229755 A1 | 9/2011 | Sugii et al. |
| 2012/0318413 A1 | 12/2012 | Kakeya et al. |
| 2013/0136983 A1 | 5/2013 | Nakatsuji et al. |
| 2013/0142690 A1 | 6/2013 | Otsuki et al. |
| 2015/0243976 A1 | 8/2015 | Otsuki et al. |
| 2015/0280216 A1 | 10/2015 | Sumiyama et al. |
| 2016/0090643 A1 | 3/2016 | Okuda et al. |
| 2017/0125804 A1 | 5/2017 | Ishida et al. |
| 2018/0114981 A1 | 4/2018 | Ishida et al. |
| 2023/0076463 A1 | 3/2023 | Sawa et al. |

FOREIGN PATENT DOCUMENTS

| | | | |
|---|---|---|---|
| CN | 1974812 A | 6/2007 | |
| CN | 101320802 A | 12/2008 | |
| CN | 101378123 A | 3/2009 | |
| CN | 101501896 A | 8/2009 | |
| CN | 101714626 A | 5/2010 | |
| CN | 102195041 A | 9/2011 | |
| CN | 103053049 A | 4/2013 | |
| CN | 105274395 A | 1/2016 | |
| CN | 106133957 A | 11/2016 | |
| CN | 108172807 A | 6/2018 | |
| JP | H11-323469 A | 11/1999 | |
| JP | 2000-182608 A | 6/2000 | |
| JP | 2005-32573 A | 2/2005 | |
| JP | 2005-290473 A | 10/2005 | |
| JP | 2007063597 A * | 3/2007 | ............ B22F 1/0011 |
| JP | 2007-169724 A | 7/2007 | |
| JP | 2008-84668 A | 4/2008 | |
| JP | 2009-74164 A | 4/2009 | |
| JP | 2009-87631 A | 4/2009 | |
| JP | 2009-108379 A | 5/2009 | |
| JP | 2009-138220 A | 6/2009 | |
| JP | 2010-212117 A | 9/2010 | |
| JP | 2011-023337 A | 2/2011 | |
| JP | 2011-127185 A | 6/2011 | |
| JP | 2012-211392 A | 11/2012 | |
| JP | 2014-207086 A | 10/2014 | |
| JP | 2016-069692 A | 5/2016 | |
| WO | 95/023435 A1 | 8/1995 | |
| WO | 01/48841 A1 | 7/2001 | |
| WO | 2009/013848 A1 | 1/2009 | |
| WO | 2011/162385 A1 | 12/2011 | |
| WO | 2013/118806 A1 | 8/2013 | |
| WO | 2016/158302 A1 | 10/2016 | |

OTHER PUBLICATIONS

Kiyoshi et al., JP 2007063597 Espacenet machine translation, 2007 (Year: 2007).*
Oct. 6, 2022 International Preliminary Report on Patentability issued in International Patent Application No. PCT/JP2021/005673.
Apr. 27, 2021 Search Report issued in International Patent Application No. PCT/JP2021/005673.
Xiangqian et al., The structure and high-temperature (333 K) electrochemical performance of $La_{0.8-x}Ce_xMg_{0.2}Ni_{3.5}$ (x=0.00-0.20) hydrogen storage alloys, International Journal of Hydrogen Energy, 2009.
Yasuoka, A doctoral dissertation: Practical Application of Rare Earth-Mg—Ni-Based (Superlattice) Hydrogen Storage Alloy and Development of High-Performance Commercial Nickel-Metal Hydride Battery Using This Alloy, 2017.
Aug. 17, 2022 First Examination Report issued in Indian Patent Application No. 202127043492.
Jun. 2, 2020 Search Report issued in International Patent Application No. PCT/JP2020/008332.
Dec. 1, 2022 Office Action issued in Chinese Patent Application No. 202080023705.9.

* cited by examiner

HYDROGEN STORAGE ALLOY FOR ALKALINE STORAGE BATTERY, ALKALINE STORAGE BATTERY USING THE SAME AS NEGATIVE ELECTRODE, AND VEHICLE

TECHNICAL FIELD

The present invention relates to a hydrogen storage alloy that is used for an alkaline storage battery, particularly to a hydrogen storage alloy that is suitably used for an alkaline storage battery installed as a power source in a hybrid electric vehicle (HEV), an automobile having a start-stop function, or the like, to an alkaline storage battery that is suitable as a power source of a hybrid electric vehicle (HEV), an automobile having a start-stop function, or the like, and to a vehicle equipped with this alkaline storage battery.

BACKGROUND ART

Recently, secondary batteries have been widely used in, for example, mobile phones, personal computers, electric tools, hybrid electric vehicles (HEVs), and pure electric vehicles (EVs), and alkaline storage batteries are mainly used for these purposes. For those alkaline storage batteries that are used for vehicle-related purposes, such as hybrid electric vehicles (HEVs), plug-in hybrid electric vehicles (PHEVs), and pure electric vehicles (EVs), high-output capability and high durability are particularly important. As the use of alkaline storage batteries for these purposes is becoming increasingly widespread, making them smaller and lighter is more desired.

Hydrogen storage alloys with an $AB_5$-type crystal structure have been conventionally used for negative electrodes of alkaline storage batteries. However, as downsizing and weight reduction of batteries achieved by these alloys are limited, development of a new hydrogen storage alloy that can realize a small, high-capacity battery has been anticipated. As solutions, Patent Literature 1 and Patent Literature 2 propose rare earth-Mg-transition metal-based hydrogen storage alloys including Mg.

One example of possible approaches to downsizing and weight reduction is to reduce the amount of a hydrogen storage alloy used for the negative electrode. However, reducing the amount of a hydrogen storage alloy raises a new problem that the output decreases due to a decrease in the number of nickel active sites. To remedy this problem, Patent Literature 3 proposes a technique of raising an operating voltage by using a hydrogen storage alloy having a high hydrogen equilibrium pressure.

Further, Patent Literature 4 discloses a battery that uses a hydrogen storage alloy. This alloy has a crystal structure of an $A_5B_{19}$-type structure, of which a stoichiometric ratio (B/A) that is a molar ratio of component B to component A is 3.8 or higher. A capacity ratio Z (=Y/X) that is a ratio of a capacity Y of a hydrogen storage alloy negative electrode to a capacity X of a nickel positive electrode of the battery is 1.2 or lower ($1.0<Z\leq1.2$). According to this literature, this battery can achieve a balance between low-temperature output and durability when used so as to be partially charged or discharged.

Some rare earth-Mg-Ni-based alloys have been proposed as hydrogen storage alloys. For example, Patent Literature 5 discloses a hydrogen storage alloy represented by a general formula: $Ln_{1-x}Mg_xNi_yA_z$ (where Ln is at least one element selected from Ga, Zr, Ti, and rare earth elements including Y; A is at least one element selected from Co, Mn, V, Cr, Nb, Al, Ga, Zn, Sn, Cu, Si, P, and B; and suffixes x, y, and z meet the conditions: $0.05\leq x\leq0.25$, $0<z\leq1.5$, and $2.8\leq y+z\leq4.0$). In this hydrogen storage alloy, Ln includes Sm at a ratio of 20 mol % or higher.

Further, Patent Literature 6 discloses, as a hydrogen storage alloy used for a negative electrode of a nickel-metal hydride secondary battery, an alloy having a composition represented by a general formula: $(La_aSm_bA_c)_{1-w}Mg_wNi_{x}A_{1-y}T_z$ (where A and T respectively represent at least one element selected from the group consisting of Pr, Nd, etc. and at least one element selected from the group consisting of V, Nb, etc.; suffixes a, b, and c meet relations respectively expressed by $a>0$, $b>0$, $0.1>c\geq0$, and $a+b+c=1$; and suffixes w, x, y, and z are within ranges respectively defined by $0.1<w\leq1$, $0.05\leq y\leq0.35$, $0\leq z\leq0.5$, $3.2\leq x+y+z\leq3.8$).

Further, Patent Literature 7 discloses, as a rare earth-Mg-Ni-based hydrogen storage alloy used for a negative electrode of an alkaline storage battery, a hydrogen storage alloy having a composition represented by a general formula: $(A_\alpha Ln_{1-\alpha})_{1-\beta}Mg_\beta Ni_{\gamma-\delta-\varepsilon}Al_\delta T_\varepsilon$ (where A represents one or more elements, including at least Sm, selected from the group consisting of Pr, Nd, Sm, and Gd; Ln represents at least one element selected from the group consisting of La, Ce, Pm, Eu, Tb, Dy, Ho, Er, Tm, Yb, Lu, Ca, Sr, Sc, Y, Ti, Zr, and Hf; T represents at least one element selected from the group consisting of V, Nb, Ta, Cr, Mo, Mn, Fe, Co, Zn, Ga, Sn, In, Cu, Si, P, and B; and suffixes $\alpha$, $\beta$, $\gamma$, $\delta$, and $\varepsilon$ represent numbers respectively meeting the conditions: $0.4\leq\alpha$, $0.05<\beta<0.15$, $3.0\leq\gamma\leq4.2$, $0.15\leq\delta\leq0.30$, $0\leq\varepsilon\leq0.20$).

Further, Patent Literature 8 reports an electrode with a hydrogen storage alloy for which hydrogen storage alloy particles of which the median size D50 represented by a passing rate 50% is within a range of 8 to 15 μm is used to achieve high-rate discharge.

CITATION LIST

Patent Literature

Patent Literature 1: Japanese Patent Laid-Open No. 11-323469
Patent Literature 2: International Publication No. WO 01/48841
Patent Literature 3: Japanese Patent Laid-Open No. 2005-32573
Patent Literature 4: Japanese Patent Laid-Open No. 2009-87631
Patent Literature 5: Japanese Patent Laid-Open No. 2009-74164
Patent Literature 6: Japanese Patent Laid-Open No. 2009-108379
Patent Literature 7: Japanese Patent Laid-Open No. 2009-138220
Patent Literature 8: Japanese Patent Laid-Open No. 2000-182608

SUMMARY OF INVENTION

Technical Problem

However, the alloys in the technologies disclosed in Patent Literature 1 and Patent Literature 2 described above are not optimized enough for the batteries to be installed in hybrid electric vehicles.

The technology disclosed in Patent Literature 3 faces a new problem that using a hydrogen storage alloy having a high hydrogen equilibrium pressure shortens the charge-discharge cycle life.

In the technology disclosed in Patent Literature 4, to be made even more smaller and lighter, the battery needs to have high output, i.e., high energy density, which in turn requires the battery to be sized with the value of a maximum dischargeable current per battery capacity (limit current value) taken into account. This is because simply downsizing the battery, i.e., simply reducing its size only reduces the battery capacity. However, this is not taken into consideration in the technology of Patent Literature 4.

The hydrogen storage alloys disclosed in Patent Literature 5, Patent Literature 6, and Patent Literature 7 each have a large alloy particle size, and alkaline storage batteries using these alloys fail to achieve a balance among three characteristics: small size, high power, and durability, in other words, a balance between the discharge characteristic and the cycle life characteristic, which is a challenge for batteries used on board vehicles. Thus, these alloys are inadequate as hydrogen storage alloys for on-board alkaline storage batteries.

The hydrogen storage alloy used in Patent Literature 8 is a so-called $AB_5$ alloy ($MmNi_{4.0}Co_{0.4}Mn_{0.3}Al_{0.3}$). It is pulverized to have an improved discharge characteristic, but needs further characteristics improvement in terms of durability etc. to be used on board a vehicle.

Having been contrived in view of these problems with the existing technologies, the present invention aims to provide a hydrogen storage alloy that is suitable particularly for an on-board nickel hydrogen battery (alkaline storage battery).

Solution to Problem

To achieve the above object, the present inventors used a fine-grained alloy of which a main phase had a crystal structure of an $A_2B_7$-type structure and which had a specific element composition as a hydrogen storage alloy for a negative electrode of an alkaline storage battery. This alloy was found to be able to achieve a good balance between the discharge capacity characteristic and the charge-discharge cycle life characteristic, which has led to the development of the present invention.

First, the present invention provides a hydrogen storage alloy for an alkaline storage battery that is characterized in that the hydrogen storage alloy is a fine-grained alloy of which a main phase has a crystal structure of an $A_2B_7$-type structure, specifically a $Ce_2Ni_7$-type or a $Gd_2Co_7$-type, and that the hydrogen storage alloy has an element composition represented by the following general formula (1):

$$(La_{1-a}Sm_a)_{1-b}Mg_bNi_cAl_dCr_e \qquad (1).$$

Here, suffixes a, b, c, d, and e in this formula (1) meet the following conditions:

$0 \leq a \leq 0.35$;

$0.15 \leq b \leq 0.30$;

$0.02 \leq d < 0.10$;

$0 \leq e \leq 0.10$;

$3.20 \leq c+d+e \leq 3.50$; and $0 < a+e$.

It is preferable that the hydrogen storage alloy according to the present invention have a particle size D50 by mass of 3 μm or lager and 20 μm or smaller and a particle size D90 by mass of 8 μm or larger and 50 μm or smaller. It is preferable that the hydrogen storage alloy have a particle size D50 by volume of 10 μm or lager and 20 μm or smaller and an initial mass saturation magnetization of 2.5 emu/g or higher and 6.0 emu/g or lower. Further, it is preferable that the hydrogen storage alloy have a layer composed of Ni at least on part of particle surfaces, and that the layer composed of Ni be an alkali-treated layer or an acid-treated layer.

Secondly, the present invention provides an alkaline storage battery that uses one of the above-described hydrogen storage alloys as a negative electrode. This alkaline storage battery is characterized in that it is installed in a hybrid electric vehicle having a motor as a driving source and supplies electricity to the motor, or that it is installed in an automobile that has a start-stop function with an engine started by a starter motor and supplies electricity to the starter motor.

Thirdly, the present invention provides a vehicle characterized in that the vehicle has, as an electricity supply source for a motor, an alkaline storage battery that uses one of the above-described hydrogen storage alloys as a negative electrode.

Advantageous Effects of Invention

Having a high output density as well as an excellent charge-discharge cycle life, the hydrogen storage alloy for an alkaline storage battery, and the alkaline storage battery that uses this hydrogen storage alloy, of the present invention are excellent in discharge capacity characteristic and capable of sufficiently high high-rate discharge also under on-board service conditions.

Pulverizing the alloy to an appropriate particle size can inhibit the progress of cracking of the alloy and improve the durability, so that the amount of Al that improves corrosion resistance can be reduced to thereby increase the discharge capacity.

Moreover, forming a layer composed of Ni on part of particle surfaces by performing surface treatment can inhibit the progress of corrosion of the alloy and further enhance the durability.

The alkaline storage battery according to the present invention can achieve reductions in size and weight. When this battery is installed in a vehicle, such as an automobile, a hybrid electric vehicle (HEV) or the like that has high motion performance and good fuel economy becomes available.

DESCRIPTION OF EMBODIMENTS

Figure 1:
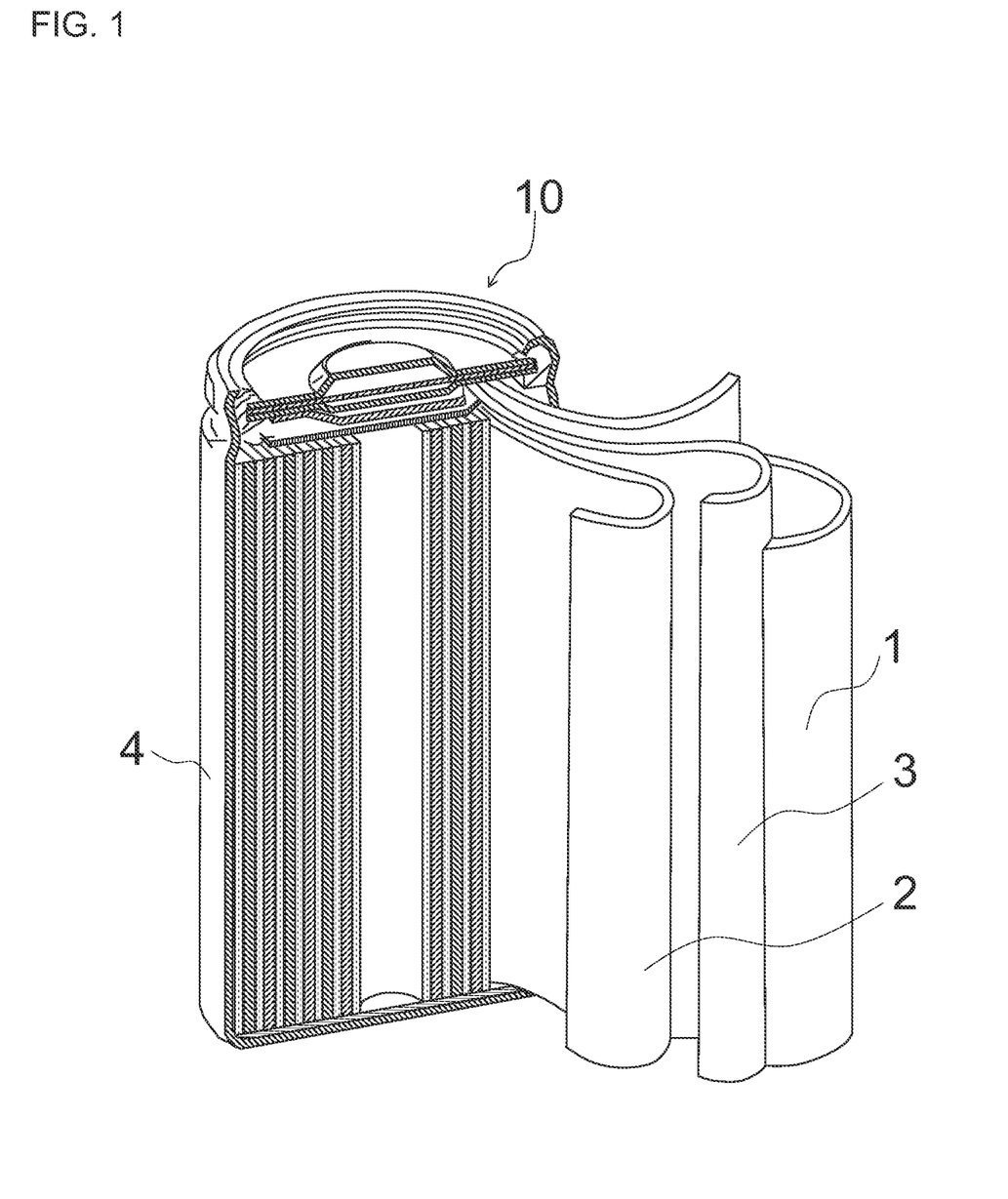
FIG. 1 is a partially cutaway perspective view illustrating an alkaline storage battery that uses a hydrogen storage alloy of the present invention.

An alkaline storage battery that uses a hydrogen storage alloy of the present invention will be described based on FIG. 1 that is a partially cutaway perspective view showing one example of the battery. An alkaline storage battery 10 is a storage battery in which an electrode group including a nickel positive electrode 1 having nickel hydroxide (Ni(OH)$_2$) as a main positive-electrode active material, a hydrogen storage alloy negative electrode 2 having a hydrogen storage alloy (MH) according to the present invention as a negative-electrode active material, and a separator 3 is housed inside a casing 4 along with an electrolyte layer (not shown) filled with an alkaline electrolytic solution.

This battery 10 is categorized as a so-called nickel-metal hydride battery (Ni-MH battery), in which the following reactions occur:

Positive electrode: $NiOOH + H_2O + e^- = Ni(OH)_2 + OH^-$

Negative electrode: $MH + OH^- = M + H_2O + e^-$

[Hydrogen Storage Alloy]

In the following, a hydrogen storage alloy according to the present invention that is used for a negative electrode of an alkaline storage battery will be described.

The hydrogen storage alloy of the present invention is required to be a fine-grained alloy of which a main phase has a crystal structure of an $A_2B_7$-type structure, specifically a $Ce_2Ni_7$-type or a $Gd_2Co_7$-type, and to have an element composition represented by the following general formula (1):

$$(La_{1-a}Sm_a)_{1-b}Mg_bNi_cAl_dCr_e \quad (1).$$

Here, suffixes a, b, c, d, and e in this formula (1) meet the following conditions:

$0 \leq a \leq 0.35$;

$0.15 \leq b \leq 0.30$;

$0.02 \leq d < 0.10$;

$0 \leq e \leq 0.10$;

$3.20 \leq c+d+e \leq 3.50$; and $0 < a+e$.

When used as a negative electrode of an alkaline storage battery, the alloy represented by this general formula (1) imparts to the battery a high discharge capacity and an excellent cycle life characteristic, and thus contributes to downsizing and weight reduction as well as durability enhancement of the alkaline storage battery.

Reasons for limiting the element composition of the hydrogen storage alloy of the present invention will be described below.

Rare earth elements: $La_{1-a}Sm_a$ (where $0 \leq a \leq 0.35$)

The hydrogen storage alloy of the present invention contains rare earth elements as the elements of component A of the $A_2B_7$-type structure. As the rare earth elements, in principle, the two elements La and Sm are essential as basic components that provide a hydrogen storage capability. Since La and Sm are different from each other in atomic radius, the ratio between these components can be used to control the hydrogen equilibrium pressure and arbitrarily set the equilibrium pressure required for the battery. In principle, it is required that the value of this ratio, as the value a representing the atomic ratio of Sm to the sum of La and Sm, be within a range of larger than zero and 0.35 or smaller. If the ratio is within this range, a hydrogen equilibrium pressure suitable for the battery is likely to be set. The value a representing the atomic ratio of Sm is preferably within a range of 0.05 or larger and 0.30 or smaller. Meanwhile, as will be described later, when Cr is contained, the durability of the hydrogen storage alloy is improved, so that even when the value a representing the atomic ratio of Sm is zero, a hydrogen storage alloy with favorable characteristics can be obtained. Therefore, the value a representing the atomic ratio of Sm can be specified to be within a range of 0 or larger and 0.35 or smaller. In this case, the value a is preferably within a range of 0.02 or larger and 0.32 or smaller, and further preferably within a range of 0.05 or larger and 0.30 or smaller.

A composition with a large amount of La allows for a high discharge capacity, and when combined with other elements, La can further improve the discharge capacity characteristic. While Pr, Nd, and Ce as rare earth elements are not actively used, these may be contained at a level of inevitable impurities.

Mg: $Mg_b$ (where $0.15 \leq b \leq 0.30$)

Mg is an essential element in the present invention that constitutes part of component A of the $A_2B_7$-type structure, and contributes to improving the discharge capacity and the cycle life characteristic. The value b representing the atomic ratio of Mg in component A should be within a range of 0.15 or larger and 0.30 or smaller. If the value b is smaller than 0.15, the hydrogen releasing performance deteriorates and the discharge capacity decreases. On the other hand, when the value b exceeds 0.30, particularly cracking due to storing and releasing of hydrogen is promoted and the cycle life characteristic, i.e., the durability degrades. The value b is preferably within a range of 0.16 or larger and 0.28 or smaller.

Ni: $Ni_c$

Ni is a main element of component B in the $A_2B_7$-type structure. The value c representing the atomic ratio of Ni will be described later.

Al: $Al_d$ (where $0.02 \leq d \leq 0.10$)

Al is an element contained as an element of component B of the $A_2B_7$-type structure. Al is effective in adjusting the hydrogen equilibrium pressure that is related to the battery voltage, as well as can improve the corrosion resistance and has an effect of improving the durability of a fine-grained hydrogen storage alloy, i.e., has an effect on the cycle life characteristic. To reliably produce this effect, the value d representing the atomic ratio of Al to component A should be within a range of 0.02 or larger and 0.10 or smaller. If the value d is smaller than 0.02, the corrosion resistance is not enough, which results in an insufficient cycle life. On the other hand, when the value d exceeds 0.10, the discharge capacity decreases. The value d is preferably within a range of 0.04 or larger and 0.09 or smaller. When the hydrogen storage alloy of the present invention is powder with a small particle size, an amount of Al on the smaller side in the range of the present invention suffices and the discharge capacity can be increased accordingly.

Cr: $Cr_e$ (where $0 \leq e \leq 0.10$ and $0 < a+e$)

Cr is an element contained as an element of component B of the $A_2B_7$-type structure. Cr is effective in adjusting the hydrogen equilibrium pressure that is related to the battery voltage, as well as can improve the corrosion resistance together with Al. In particular, Cr has an effect of improving the durability of a fine-grained hydrogen storage alloy, i.e., has an effect on the cycle life characteristic. To reliably produce this effect, the value e representing the atomic ratio of Cr to component A should be within a range of 0 or larger and 0.10 or smaller. As described above, Sm or Cr is essential for the hydrogen storage alloy of the present invention, and therefore the value a and the value e representing the atomic ratios of Sm and Cr cannot be both zero at the same time. Thus, the relation 0<a+e is met. On the other hand, when the value e exceeds 0.10, the excessive amount of Cr induces cracking due to storing and releasing of hydrogen, resulting in reduced durability and an insufficient cycle life. The value e is preferably within a range of 0.005 or larger and 0.09 or smaller, and further preferably within a range of 0.01 or larger and 0.08 or smaller. When the hydrogen storage alloy of the present invention is powder with a small particle size, an amount of Cr on the smaller side in the preferable range of the present invention suffices and the discharge capacity can be increased accordingly.

Ratio Between Component A and Component B: 3.20≤c+d+e≤3.50

A stoichiometric ratio that is a molar ratio of component B (Ni, Al, and Cr) to component A of the $A_2B_7$-type structure, i.e., the value of c+d+e represented by the general formula is preferably within a range of 3.25 or larger and 3.50 or smaller when Cr is not contained (e=0). On the other hand, containing Cr has an effect of inhibiting the formation of a subphase and an effect of improving the corrosion resistance and thereby improving the durability; therefore, the lower limit can be extended to 3.20. When the value is smaller than 3.20, a subphase, i.e., an $AB_3$ phase increases, and particularly the discharge capacity decreases. On the other hand, when the value exceeds 3.50, an $AB_5$ phase increases and cracking due to storage and releasing of hydrogen is promoted, resulting in a decrease in the durability, i.e., the cycle life. The value is preferably within a range of 3.22 or larger and 3.47 or smaller, and further preferably 3.25 or larger and 3.47 or smaller.

[Manufacturing Method of Hydrogen Storage Alloy]

Next, a manufacturing method of the hydrogen storage alloy of the present invention will be described.

For the hydrogen storage alloy of the present invention, metal elements such as rare earth elements (Sm, La, etc.), magnesium (Mg), nickel (Ni), aluminum (Al), and chromium (Cr) are weighed to a predetermined molar ratio. Then, these raw materials are fed into an alumina crucible installed in a high-frequency induction furnace, melted in an atmosphere of an inert gas, such as an argon gas, and cast into a mold to produce hydrogen storage alloy ingots. Alternatively, samples in the form of flakes with a thickness of about 200 to 500 μm may be directly produced using a strip casting method.

Since the hydrogen storage alloy of the present invention contains Mg that has a low melting point and a high vapor pressure as a main component, when the raw materials of all the alloy components are melted at once, Mg may evaporate and make it difficult to obtain an alloy with the target chemical composition. Therefore, to manufacture the hydrogen storage alloy of the present invention by the melting method, it is preferable that, first, the alloy components other than Mg be melted, and that then Mg raw materials such as metal Mg and an Mg alloy be fed into the resulting molten metal. Further, it is desirable that this melting process be performed in an atmosphere of an inert gas, such as argon or helium. Specifically, it is preferable that this process be performed in a depressurized atmosphere in which an inert gas containing 80 vol % or more of an argon gas is adjusted to 0.05 to 0.2 MPa.

It is preferable that the alloy melted under the above conditions be thereafter cast into a water-cooled mold and solidified into hydrogen storage alloy ingots. Then, the melting point ($T_m$) of each of the obtained hydrogen storage alloy ingots is measured using a differential scanning calorimeter (DSC). This is because it is preferable that the hydrogen storage alloy of the present invention be subjected to heat treatment of holding casted ingots in an atmosphere of either an inert gas, such as argon or helium, or a nitrogen gas, or a mixture of the two, at a temperature range of 900° C. or higher to the melting point ($T_m$) of the alloy, for three to 50 hours. This heat treatment can raise the ratio of the main phase having the $A_2B_7$-type crystal structure in the hydrogen storage alloy to 50 vol % or higher and reduce or eliminate an $AB_2$ phase, an $AB_3$ phase, and an $AB_5$ phase that are subphases. That the crystal structure of the main phase of the obtained hydrogen storage alloy is an $A_2B_7$-type structure can be confirmed by X-ray diffraction measurement using Cu-Kα rays.

If the heat treatment temperature is lower than 900° C., subphases remain due to insufficient diffusion of the elements, which may lead to a decrease in the discharge capacity of the battery or deterioration of the cycle characteristic thereof. On the other hand, if the heat treatment temperature is the alloy's melting point $T_m$ minus 20° C. or higher ($T_m$–20° C. or higher), crystal grains of the main phase coarsen and the Mg component evaporates, which may result in a decrease in the hydrogen storage amount due to particle size reduction and changes in the chemical composition. Therefore, the heat treatment temperature is preferably within a range of 900° C. to ($T_m$–30° C.). Further, the temperature is preferably within a range of 900° C. to ($T_m$–50° C.).

If the holding time of the heat treatment is three hours or shorter, the ratio of the main phase cannot be stably raised to 50 vol % or higher. Further, due to insufficient homogenization of the chemical components of the main phase, expansion and contraction during storage and release of hydrogen occur unevenly, so that greater distortion and defect may occur and adversely affect the cycle characteristic. It is preferable that the holding time of the heat treatment be four hours or longer, and more preferably five hours or longer from the viewpoint of homogenization of the main phase and improvement of crystallinity. However, when the holding time exceeds 50 hours, a larger amount of Mg evaporates and causes a change in the chemical composition, which may result in formation of an $AB_5$-type subphase. Further, such a long holding time may add to the manufacturing cost and cause dust explosion of evaporated fine Mg powder, and is therefore not preferable.

The heat-treated alloy is pulverized by a dry method or a wet method. In the case of pulverization by the dry method, the alloy is pulverized using, for example, a hammer mill or an ACM pulverizer. On the other hand, in the case of pulverization by the wet method, the alloy is pulverized using a bead mill, an attrition mill, or the like. Wet pulverization can safely produce fine powder and is therefore preferable particularly when producing fine powder.

When using the hydrogen storage alloy of the present invention for a battery to be used on board a vehicle, it is preferable that the alloy be pulverized to a particle size within a range of 3 μm or larger and 20 μm or smaller, and more preferably within a range of 5 μm or larger and 15 μm or smaller, as a particle size D50 represented by a passing rate 50% by mass, from the viewpoint of the balance among the battery characteristics including the output and the cycle life characteristic. Further, as these characteristics deteriorate when the particle size distribution of alloy particles is too wide, it is preferable that the particle size D10 represented by a passing rate 10% by mass be within a range of 0.5 μm or larger and 9 μm or smaller; that the particle size D90 represented by a passing rate 90% by mass be within a range of 8 μm or larger and 50 μm or smaller; that D10 be within a range of 1 μm or larger and 7 μm or smaller; and that D90 be within a range of 10 μm or larger and 40 μm or smaller. The particle size of the alloy particles can be controlled by adjusting the conditions including the diameter, the amount, and the number of rotations of the media.

Here, as the aforementioned particle size distributions D50, D10, and D90 of the alloy particles, values measured by a laser diffraction-scattering particle size distribution measuring device. As the measuring device, for example, MT3300EXII manufactured by MicrotracBEL Corp. can be used.

The pulverized alloy particles may be thereafter subjected to surface treatment of performing alkali treatment using an alkaline solution, such as KOH or NaOH, or acid treatment using nitric acid, sulfuric acid, or an aqueous hydrochloric acid solution. These surface treatments can be performed to form a layer composed of Ni (an alkali-treated layer or an acid-treated layer) on at least part of surfaces of alloy particles and thereby inhibit the progress of corrosion of the alloy as well as enhance the durability. Thus, the cycle characteristic of the battery and the discharge characteristic thereof over a wide temperature range can be improved. In particular, in the case of the acid treatment, it is preferable that hydrochloric acid be used as it allows precipitation of Ni with less damage to the alloy's surface. When pulverizing the alloy by the wet method, the surface treatment can also be performed at the same time.

[Alkaline Storage Battery]

Next, an example of the configuration of an alkaline storage battery that uses the hydrogen storage alloy of the present invention will be described with reference to FIG. 1.

Here, the alkaline storage battery 10 of the present invention is composed at least of the positive electrode 1, the negative electrode 2, the separator 3, and the casing 4 (battery case) that houses them while being filled with an electrolyte. These components will be specifically described below.

<Positive Electrode>

The positive electrode 1 is usually composed of a positive-electrode active material layer and a positive-electrode collector. The positive-electrode active material layer contains at least a positive-electrode active material. The positive-electrode active material layer may further contain at least one of a conductive assistant, a binder, and a thickener. The positive-electrode active material is not particularly limited and may be any material that functions as a battery when combined with the above-described hydrogen storage alloy (negative electrode material). Examples of the positive-electrode active material include a single metal, an alloy, and hydroxide. The positive-electrode active material is preferably a material that contains nickel oxide and is composed mainly of nickel oxyhydroxide and/or nickel hydroxide. The amount of nickel oxide contained in the positive-electrode active material may be, for example, 90 to 100 mass % and may also be 95 to 100 mass %. The average particle size of the nickel oxide can be appropriately selected, for example, from a range of 3 to 35 μm, and is preferably selected from a range of 3 to 25 μm.

The conductive assistant is not particularly limited and may be any material that can impart electron conductivity. Examples of the conductive assistant include metal powder, such as Ni powder, oxide, such as cobalt oxide, and a carbon material, such as graphite and carbon nanotube. While the amount of conductive assistant to be added is not particularly limited, the amount is, for example, preferably within a range of 0.1 to 50 parts by weight, and further preferably within a range of 0.1 to 30 parts by weight, relative to 100 parts by mass of the positive-electrode active material. Examples of the binder include synthetic rubber, such as styrene-butadiene rubber (SBR), cellulose, such as carboxymethyl cellulose (CMC), polyol, such as polyvinyl alcohol (PVA), and fluorine resin, such as polyvinylidene fluoride (PVDF). The amount of binder should be, for example, 7 parts by mass or smaller, and may be within a range of 0.01 to 5 parts by mass, or further within a range of 0.05 to 2 parts by mass, relative to 100 parts by mass of the positive-electrode active material.

Further, examples of the thickener include carboxymethyl cellulose and modified carboxymethyl cellulose (including salt, such as Na salt); a cellulose derivative, such as methylcellulose; saponified polymer having a vinyl acetate unit, such as polyvinyl alcohol; and polyalkylene oxide, such as polyethylene oxide. One of these thickeners may be used alone, or two or more of these thickeners may be used in combination. The amount of thickener is, for example, 5 parts by mass or smaller, and may be within a range of 0.01 to 3 parts by mass, or further within a range of 0.05 to 1.5 parts by mass, relative to 100 parts by mass of the positive-electrode active material.

Examples of the material of the positive-electrode collector include stainless steel, aluminum, nickel, iron, and titanium. Examples of the form of the positive-electrode collector include a foil form, a mesh form, and a porous form, and the positive-electrode collector may have any form.

The positive electrode can be formed by attaching a positive-electrode mixture including the positive-electrode active material to a support (positive-electrode collector). Usually, the positive-electrode mixture is produced by turning the material into paste along with the above-described positive-electrode active material, the conductive assistant, and the binder. As a dispersion medium, water, an organic medium, or a mixed medium that is a mixture of two or more media selected from these media can be used. As necessary, a conductive assistant, a binder, a thickener, etc. may be added, but it is not absolutely necessary to add them (especially the binder and the thickener).

For the positive electrode, the above-described paste of positive-electrode mixture may be applied to the support according to the shape of the support or may be filled into holes of the support. The positive electrode can be formed by applying or filling the paste to or into the support, drying the paste and removing the dispersion medium, and then compressing the resulting dry object in the thickness direction (e.g., rolling it between a pair of rolls).

<Negative Electrode>

The negative electrode 2 is usually composed of a negative-electrode active material layer and a negative-electrode collector. The negative-electrode active material layer needs to contain at least the above-described hydrogen storage alloy of the present invention as a negative-electrode active material. The negative-electrode active material layer may further contain at least one of a conductive assistant, a binder, and a thickener. The conductive assistant is not particularly limited and may be any material that can impart electron conductivity. Examples of the conductive assistant include metal powder, such as Ni powder, oxide, such as cobalt oxide, and a carbon material, such as graphite and carbon nanotube. While the amount of conductive assistant to be added is not particularly limited, the amount is, for example, preferably within a range of 0.1 to 50 parts by weight, and further preferably within a range of 0.1 to 30 parts by weight, relative to 100 parts by weight of the hydrogen storage alloy powder. Examples of the binder include synthetic rubber, such as styrene-butadiene rubber (SBR), cellulose, such as carboxymethyl cellulose (CMC), polyol, such as polyvinyl alcohol (PVA), and fluorine resin, such as polyvinylidene fluoride (PVDF). The amount of binder should be, for example, 7 parts by mass or smaller, and may be within a range of 0.01 to 5 parts by mass, or further within a range of 0.05 to 2 parts by mass, relative to 100 parts by weight of the hydrogen storage alloy powder.

Examples of the material of the negative-electrode collector include steel, stainless steel, aluminum, nickel, iron, titanium, and carbon. Examples of the form of the negative-electrode collector include a foil form, a mesh form, and a porous form, and the negative-electrode collector may have any form.

To form a negative-electrode active material layer on the negative-electrode collector, the material is turned into paste. The above-described negative-electrode active material, conductive assistant, binder, thickener, etc. are included when producing this paste.

The negative electrode for a nickel-metal hydride battery is produced by molding the negative-electrode paste including the hydrogen storage alloy powder of the present invention into a predetermined shape and supporting the molded negative-electrode paste onto a negative-electrode core (negative-electrode collector), or by preparing a negative-electrode paste including the hydrogen storage alloy powder, applying the paste to the negative-electrode collector material, and then drying the paste.

<Electrolyte Layer>

The electrolyte layer is a layer that is formed between the positive electrode and the negative electrode and contains an aqueous electrolytic solution. Here, the aqueous electrolytic solution refers to an electrolytic solution for which water is mainly used as a solvent, and this solvent may include components other than water. The ratio of the water to the entire solvent of the electrolytic solution should be 50 mol % or higher, and may be 70 mol % or higher, 90 mol % or higher, or 100 mol %.

It is preferable that the aqueous electrolytic solution be an alkaline solution. Examples of the solute of the alkaline solution include potassium hydroxide (KOH) and sodium hydroxide (NaOH), and LiOH may also be included in the solute. A higher concentration of the solute in the aqueous electrolytic solution is preferable; for example, the concentration should be 3 mol/L or higher and is preferably 5 mol/L or higher.

The electrolyte layer has a separator 3. Providing a separator 3 can effectively prevent short circuit. Examples of the separator 3 include a sulfonated non-woven fabric or porous membrane containing a resin, such as polyethylene or polypropylene.

<Casing>

The casing 4 is a battery case (cell case) that houses the positive electrode 1, the negative electrode 2, and the separator 3 described above and is filled with an electrolyte. The material of the casing 4 may be any material that allows the casing 4 to remain stable without being corroded by the electrolytic solution and hold a gas (oxygen or hydrogen) that is temporarily produced during charge and the electrolytic solution so as not to leak to the outside. For example, a metal case and a resin case are commonly used. In the case of a stacked alkaline storage battery 10 that has a stack in which pluralities of positive electrodes 1 and negative electrodes 2 are stacked on top of each other with the separator 3 in between, the casing 4 may be a structure that seals the periphery of this stack with a frame-shaped resin.

<Battery>

The battery 10 of the present invention is usually a secondary battery. Thus, the battery 10 can be repeatedly charged and discharged and is therefore suitable, for example, as an on-board battery. In that case, the battery 10 is not limited to being used as a battery for a hybrid electric vehicle in which the battery supplies electricity to a vehicle driving motor, but may also be used in an automobile having a start-stop function to supply electricity to a starter motor that restarts an engine. The term "secondary battery" covers a secondary battery that is used like a primary battery (used to discharge only once after charge). Examples of the form of the battery include a coin form, a laminate form, a cylindrical form, and a rectangular form, and the battery 10 may have any form.

<Vehicle>

The vehicle of the present invention is a vehicle equipped with, as an electricity supply source for a motor, an alkaline storage battery that uses the above-described hydrogen storage alloy as a negative electrode. By using the alkaline storage battery of the present invention that is dramatically reduced in size and weight compared with conventional ones, this vehicle can achieve improved motion performance, higher fuel efficiency, and a longer range.

EXAMPLES

Example 1

Cells for evaluation in which hydrogen storage alloys No. 1 to 60 having the element compositions shown in Table 1 below were used as the negative-electrode active material were produced by the procedure to be described below, and experiments for evaluating their characteristics were conducted. Alloys No. 1 to 14 and 35 to 57 shown in Table 1 are alloy examples that comply with the conditions of the present invention (inventive examples), and alloys No. 15 to 34 and 58 to 60 are alloy examples that do not meet the conditions of the present invention (comparative examples). Alloy No. 15 that is a comparative example is used as a reference alloy for evaluating cell characteristics.

(Production of Negative-Electrode Active Material)

The raw materials (Sm, La, Mg, Ni, Al, and Cr, each with a purity of 99% or higher) of alloys No. 1 to 60 shown in Table 1 were melted using a high-frequency induction heating furnace in an argon atmosphere (Ar: 100 vol %, 0.1 MPa) and cast to produce ingots. Then, these alloy ingots were subjected to heat treatment of holding them in an argon atmosphere (Ar: 90 vol %, 0.1 MPa) at the temperatures of the respective alloys' melting points $T_m$ minus 50° C. (940 to 1130° C.) for ten hours. Thereafter, these alloy ingots were roughly pulverized, and then finely pulverized to 13 μm as a D50 by mass by a wet bead mill to obtain samples (negative-electrode active materials) for cell evaluation, provided that $AB_5$-type alloy No. 15 that serves as a reference for alloy cell evaluation was wet-pulverized into fine powder with a size of 25 μm as a D50 by mass to obtain a sample (negative-electrode active material) for cell evaluation. After the heat treatment, X-ray diffraction measurement was performed on the pulverized powder, and it was confirmed that the main phase of each of alloys No. 1 to 14 and 35 to 57 that are inventive examples of the present invention was an $A_2B_7$ phase.

(Production of Cells for Evaluation)

<Negative Electrode>

The negative-electrode active material prepared as described above, Ni powder as a conductive assistant, and two binders (styrene-butadiene rubber (SBR) and carboxymethyl cellulose (CMC)) were mixed to a ratio by weight of negative-electrode active material:Ni powder: SBR:CMC=95.5:3.0:1.0:0.5 and kneaded into a pasty composition. This pasty composition was applied to perforated metal, dried at 80° C., and then roll-pressed under a load of 15 kN to obtain a negative electrode.

<Positive Electrode>

Nickel hydroxide ($Ni(OH)_2$), metallic cobalt (Co) as a conductive assistant, and two binders (styrene-butadiene rubber (SBR) and carboxymethyl cellulose (CMC)) were mixed to a ratio by weight of $Ni(OH)_2$:Co:SBR:CMC=95.5: 2.0:2.0:0.5 and kneaded into a pasty composition. This pasty composition was applied to porous nickel, dried at 80° C., and then roll-pressed under a load of 15 kN to obtain a positive electrode.

<Electrolytic Solution>

As the electrolytic solution, an alkaline solution obtained by mixing potassium hydroxide (KOH) into pure water to a concentration of 6 mol/L and further adding 0.1 mol/L of LiOH thereto was used.

<Cells for Evaluation>

The above-described positive electrode and negative electrode were disposed inside an acrylic casing as a counter electrode and a working electrode, respectively, and the above-described electrolytic solution was poured into the exterior can to produce a cell having an Hg/HgO electrode as a reference electrode, which was then used for an evaluation test. Here, the capacity ratio between the working electrode and the counter electrode was adjusted to working electrode:counter electrode=1:3.

(Evaluation of Cell Characteristics)

The evaluation test of cells for evaluation based on alloys No. 1 to 60 obtained as described above was performed by the following procedure. In this test, all the cells were evaluated at 25° C.

(1) Discharge Capacity of Electrode

The electrode discharge capacity of the working electrode was checked by the following process: Constant-current charge was performed at a current value of 80 mA/g per active material of the working electrode for ten hours, and then constant-current discharge was performed at a current value of 40 mA/g per active material of the working electrode. The discharge was ended on the condition that the potential of the working electrode became −0.5 V. This charge-discharge process was repeated ten times, and the maximum value of the discharge capacity was used as the electrode discharge capacity of the working electrode being tested. It was confirmed that when the cell is charged and discharged ten times, the discharge capacity of the working electrode became saturated and stable.

Using the discharge capacity of $AB_5$-type alloy No. 15 shown in Table 1 as a reference capacity, the ratio of the measured discharge capacity to this reference capacity was calculated by the following formula (2). When the calculated ratio is higher than 1.10, the alloy was evaluated as having a larger discharge capacity than the $AB_5$ alloy and therefore excellent.

Discharge capacity=(discharge capacity of alloy being evaluated)/(discharge capacity of $AB_5$-type alloy No. 15) (2)

(2) Cycle Life Characteristic

Using the cells for each of which the electrode discharge capacity of the working electrode was confirmed in (1) Discharge Capacity of Electrode, the cycle life characteristic of each working electrode was determined by the following process:

A current value required to complete charge or discharge of the electrode discharge capacity of the working electrode confirmed in (1) Discharge Capacity of Electrode in one hour was assumed to be 1C. A process of performing constant-current charge and constant-current discharge at a current value of C/2 with the charge rate of the working electrode within a range of 20 to 80% was counted as one cycle. A hundred cycles of this process were performed and the discharge capacity after the 100 cycles was measured, and then a capacity maintenance rate was determined by the following formula (3):

Capacity maintenance rate=(discharge capacity at the 100th cycle)/(discharge capacity at the first cycle) (3)

To evaluate the cycle life characteristic, the capacity maintenance rate after 100 cycles of $AB_5$-type alloy No. 15 shown in Table 1 was used as a reference capacity maintenance rate, and a ratio to this reference capacity maintenance rate was calculated by the following formula (4). When this ratio is higher than 1.10, the alloy was evaluated as having a higher cycle life characteristic than the $AB_5$ alloy and therefore excellent.

Cycle life characteristic=(capacity maintenance rate after 100 cycles of alloy being measured)/(capacity maintenance rate after 100 cycles of $AB_5$-type alloy (No. 15)) (4)

TABLE 1

| | | Electrode characteristics | | |
|---|---|---|---|---|
| Alloy No. | Element composition of hydrogen storage alloy | Discharge capacity (relative to alloy No. 15) | Cycle life characteristic (relative to alloy No. 15) | Remarks |
| 1 | $(La_{0.98}Sm_{0.02})_{0.71}Mg_{0.29}Ni_{3.16}Al_{0.09}$ | 1.20 | 1.11 | Inventive example |
| 2 | $(La_{0.65}Sm_{0.35})_{0.85}Mg_{0.15}Ni_{3.48}Al_{0.02}$ | 1.21 | 1.14 | Inventive example |
| 3 | $(La_{0.70}Sm_{0.30})_{0.80}Mg_{0.20}Ni_{3.30}Al_{0.07}$ | 1.23 | 1.23 | Inventive example |
| 4 | $(La_{0.68}Sm_{0.32})_{0.80}Mg_{0.20}Ni_{3.18}Al_{0.08}$ | 1.23 | 1.20 | Inventive example |
| 5 | $(La_{0.90}Sm_{0.10})_{0.75}Mg_{0.25}Ni_{3.25}Al_{0.05}$ | 1.28 | 1.17 | Inventive example |
| 6 | $(La_{0.85}Sm_{0.15})_{0.76}Mg_{0.24}Ni_{3.25}Al_{0.07}$ | 1.24 | 1.16 | Inventive example |
| 7 | $(La_{0.80}Sm_{0.20})_{0.80}Mg_{0.20}Ni_{3.36}Al_{0.04}$ | 1.26 | 1.15 | Inventive example |
| 8 | $(La_{0.90}Sm_{0.10})_{0.77}Mg_{0.23}Ni_{3.29}Al_{0.06}$ | 1.27 | 1.19 | Inventive example |
| 9 | $(La_{0.90}Sm_{0.10})_{0.78}Mg_{0.23}Ni_{3.19}Al_{0.08}$ | 1.25 | 1.21 | Inventive example |

TABLE 1-continued

| Alloy No. | Element composition of hydrogen storage alloy | Discharge capacity (relative to alloy No. 15) | Discharge capacity (relative to alloy No. 15) | Electrode characteristics |
|---|---|---|---|---|
| 10 | $(La_{0.80}Sm_{0.20})_{0.80}Mg_{0.20}Ni_{3.31}Al_{0.07}$ | 1.25 | 1.20 | Inventive example |
| 11 | $(La_{0.80}Sm_{0.20})_{0.82}Mg_{0.18}Ni_{3.19}Al_{0.08}$ | 1.23 | 1.24 | Inventive example |
| 12 | $(La_{0.70}Sm_{0.30})_{0.81}Mg_{0.19}Ni_{3.20}Al_{0.09}$ | 1.23 | 1.28 | Inventive example |
| 13 | $(La_{0.70}Sm_{0.30})_{0.82}Mg_{0.18}Ni_{3.25}Al_{0.06}$ | 1.24 | 1.25 | Inventive example |
| 14 | $(La_{0.85}Sm_{0.15})_{0.79}Mg_{0.21}Ni_{3.38}Al_{0.08}$ | 1.23 | 1.23 | Inventive example |
| 15 | $La_{0.90}Ce_{0.10}Ni_{4.20}Co_{0.40}Mn_{0.30}Al_{0.30}$ | 1.00 | 1.00 | Comparative Example (reference) |
| 16 | $(La_{0.88}Sm_{0.10}Zr_{0.02})_{0.90}Mg_{0.10}Ni_{3.20}Al_{0.20}$ | 0.94 | 1.16 | Comparative Example |
| 17 | $(La_{0.80}Sm_{0.20})_{0.85}Mg_{0.15}Ni_{3.40}Al_{0.12}$ | 1.15 | 1.02 | Comparative Example |
| 18 | $(La_{0.50}Sm_{0.50})_{0.90}Mg_{0.10}Ni_{3.20}Al_{0.22}$ | 0.96 | 1.18 | Comparative Example |
| 19 | $(La_{0.55}Sm_{0.45})_{0.90}Mg_{0.10}Ni_{3.70}Al_{0.10}$ | 1.14 | 0.90 | Comparative Example |
| 20 | $(La_{0.75}Sm_{0.25})_{0.80}Mg_{0.20}Ni_{3.50}Al_{0.10}$ | 1.20 | 0.88 | Comparative Example |
| 21 | $(La_{0.80}Sm_{0.20})_{0.9}Mg_{0.1}Ni_{3.20}Zn_{0.30}$ | 0.96 | 1.00 | Comparative example |
| 22 | $(La_{0.70}Sm_{0.30})_{0.89}Mg_{0.11}Ni_{3.61}Al_{0.09}$ | 1.17 | 0.89 | Comparative example |
| 23 | $(La_{0.78}Sm_{0.22})_{0.80}Mg_{0.20}Ni_{3.51}Al_{0.09}$ | 1.24 | 0.84 | Comparative example |
| 24 | $(La_{0.81}Sm_{0.19})_{0.80}Mg_{0.20}Ni_{3.35}Al_{0.13}$ | 1.17 | 1.04 | Comparative example |
| 25 | $(La_{0.80}Sm_{0.20})_{0.80}Mg_{0.20}Ni_{3.53}Al_{0.07}$ | 1.23 | 0.80 | Comparative example |
| 26 | $(La_{0.80}Sm_{0.20})_{0.80}Mg_{0.20}Ni_{3.54}Al_{0.11}$ | 1.20 | 0.90 | Comparative example |
| 27 | $(La_{0.80}Sm_{0.20})_{0.80}Mg_{0.20}Ni_{3.54}Al_{0.06}$ | 1.21 | 0.75 | Comparative example |
| 28 | $(La_{0.81}Sm_{0.19})_{0.80}Mg_{0.20}Ni_{3.40}Al_{0.20}$ | 1.16 | 0.98 | Comparative example |
| 29 | $(La_{0.75}Sm_{0.25})_{0.80}Mg_{0.20}Ni_{3.60}Al_{0.06}$ | 1.22 | 0.72 | Comparative example |
| 30 | $(La_{0.90}Sm_{0.10})_{0.77}Mg_{0.23}Ni_{3.58}$ | 1.26 | 0.70 | Comparative example |
| 31 | $La_{0.67}Mg_{0.33}Ni_{3.35}Al_{0.20}$ | 1.08 | 0.85 | Comparative example |
| 32 | $(La_{0.75}Sm_{0.25})_{0.78}Mg_{0.22}Ni_{3.05}Al_{0.10}$ | 1.08 | 0.94 | Comparative example |
| 33 | $(La_{0.90}Sm_{0.10})_{0.78}Mg_{0.23}Ni_{3.14}Al_{0.06}$ | 1.13 | 0.99 | Comparative example |
| 34 | $(La_{0.45}Sm_{0.55})_{0.89}Mg_{0.11}Ni_{3.26}Al_{0.16}$ | 1.10 | 1.02 | Comparative example |
| 35 | $La_{0.73}Mg_{0.27}Ni_{3.30}Al_{0.08}Cr_{0.02}$ | 1.28 | 1.20 | Inventive example |
| 36 | $La_{0.73}Mg_{0.27}Ni_{3.28}Al_{0.08}Cr_{0.04}$ | 1.26 | 1.24 | Inventive example |
| 37 | $La_{0.75}Mg_{0.25}Ni_{3.32}Al_{0.08}Cr_{0.01}$ | 1.29 | 1.22 | Inventive example |
| 38 | $La_{0.75}Mg_{0.25}Ni_{3.28}Al_{0.08}Cr_{0.03}$ | 1.25 | 1.25 | Inventive example |
| 39 | $(La_{0.90}Sm_{0.10})_{0.78}Mg_{0.22}Ni_{3.30}Al_{0.09}Cr_{0.01}$ | 1.30 | 1.24 | Inventive example |
| 40 | $(La_{0.90}Sm_{0.10})_{0.77}Mg_{0.23}Ni_{3.30}Al_{0.08}Cr_{0.02}$ | 1.29 | 1.26 | Inventive example |
| 41 | $(La_{0.90}Sm_{0.10})_{0.78}Mg_{0.22}Ni_{3.30}Al_{0.06}Cr_{0.05}$ | 1.25 | 1.24 | Inventive example |
| 42 | $(La_{0.90}Sm_{0.10})_{0.77}Mg_{0.23}Ni_{3.30}Al_{0.04}Cr_{0.08}$ | 1.24 | 1.18 | Inventive example |
| 43 | $(La_{0.90}Sm_{0.10})_{0.78}Mg_{0.22}Ni_{3.30}Al_{0.02}Cr_{0.10}$ | 1.21 | 1.14 | Inventive example |
| 44 | $(La_{0.80}Sm_{0.20})_{0.80}Mg_{0.20}Ni_{3.30}Al_{0.09}Cr_{0.01}$ | 1.22 | 1.28 | Inventive example |
| 45 | $(La_{0.80}Sm_{0.20})_{0.80}Mg_{0.20}Ni_{3.30}Al_{0.08}Cr_{0.02}$ | 1.21 | 1.30 | Inventive example |
| 46 | $(La_{0.80}Sm_{0.20})_{0.80}Mg_{0.20}Ni_{3.30}Al_{0.06}Cr_{0.04}$ | 1.20 | 1.28 | Inventive example |
| 47 | $(La_{0.80}Sm_{0.20})_{0.80}Mg_{0.20}Ni_{3.30}Al_{0.02}Cr_{0.08}$ | 1.22 | 1.19 | Inventive example |
| 48 | $(La_{0.95}Sm_{0.05})_{0.76}Mg_{0.24}Ni_{3.20}Al_{0.09}Cr_{0.01}$ | 1.28 | 1.22 | Inventive example |
| 49 | $(La_{0.95}Sm_{0.05})_{0.76}Mg_{0.24}Ni_{3.19}Al_{0.09}Cr_{0.02}$ | 1.26 | 1.24 | Inventive example |
| 50 | $(La_{0.70}Sm_{0.30})_{0.82}Mg_{0.18}Ni_{3.25}Al_{0.09}Cr_{0.04}$ | 1.23 | 1.29 | Inventive example |
| 51 | $(La_{0.65}Sm_{0.35})_{0.85}Mg_{0.15}Ni_{3.28}Al_{0.07}Cr_{0.02}$ | 1.24 | 1.29 | Inventive example |
| 52 | $(La_{0.75}Sm_{0.25})_{0.80}Mg_{0.20}Ni_{3.23}Al_{0.09}Cr_{0.02}$ | 1.22 | 1.28 | Inventive example |
| 53 | $La_{0.75}Mg_{0.25}Ni_{3.13}Al_{0.06}Cr_{0.01}$ | 1.18 | 1.20 | Inventive example |
| 54 | $(La_{0.90}Sm_{0.10})_{0.76}Mg_{0.24}Ni_{3.12}Al_{0.06}Cr_{0.02}$ | 1.19 | 1.22 | Inventive example |
| 55 | $(La_{0.80}Sm_{0.20})_{0.77}Mg_{0.23}Ni_{3.18}Al_{0.05}Cr_{0.02}$ | 1.23 | 1.23 | Inventive example |
| 56 | $(La_{0.80}Sm_{0.20})_{0.80}Mg_{0.20}Ni_{3.26}Al_{0.02}Cr_{0.12}$ | 1.22 | 1.02 | Comparative example |
| 57 | $(La_{0.80}Sm_{0.20})_{0.80}Mg_{0.20}Ni_{3.23}Al_{0.02}Cr_{0.15}$ | 1.18 | 0.96 | Comparative example |
| 58 | $(La_{0.80}Sm_{0.20})_{0.85}Mg_{0.15}Ni_{3.00}Al_{0.12}$ | 1.05 | 1.04 | Comparative example |

As is clear from Table 1, compared with $AB_5$-type alloy No. 15, alloys No. 1 to 14 and 35 to 57 that are inventive examples have excellent characteristics, with the evaluation values equal to or higher than 1.10 for each of the discharge capacity and the cycle life characteristic. Especially the discharge capacities are excellent, with all the evaluation values equal to or higher than 1.20. Further, the alloys containing Cr are excellent in cycle life characteristic. It can be seen that, in contrast, the evaluation values of alloys No. 15 to 34 and 58 to 60 that are comparative examples are lower than 1.05 for one of the characteristics.

Example 2

(Production of Negative-Electrode Active Material)

A hydrogen storage alloy (samples No. B1 to $B_7$) having an element composition of $(La_{0.80}Sm_{0.20})_{0.80}Mg_{0.20}Ni_{3.31}Al_{0.09}$ was melted using a high-frequency induction heating furnace, which had been vacuumed once, in an argon atmosphere (Ar: 90 vol %, 0.15 MPa) and cast to obtain an ingot. Then, this ingot was subjected to heat treatment of holding it in an argon atmosphere (Ar: 100 vol %, 0.5 MPa) at 1000° C. (the alloy's melting point $T_m$ minus 50° C.) for ten hours. Thereafter, the ingot was roughly pulverized, and then finely pulverized to the particle sizes shown in Table 2 to obtain samples (negative-electrode active materials) for cell evaluation. Further, a hydrogen storage alloy (samples No. B8 to B14) having an element composition of $(La_{0.90}Sm_{0.10})_{0.76}Mg_{0.24}Ni_{3.29}Al_{0.09}Cr_{0.02}$ was melted using a high-frequency induction heating furnace, which had been vacuumed once, in an argon atmosphere (Ar: 90 vol %, 0.15 MPa) and cast to obtain an ingot. Then, this ingot was subjected to heat treatment of holding it in an argon atmosphere (Ar: 100 vol %, 0.5 MPa) at 960° C. (the alloy's melting point $T_m$ minus 50° C.) for ten hours. Thereafter, the ingot was roughly pulverized, and then finely pulverized to the particle sizes shown in Table 2 to obtain samples (negative-electrode active materials) for cell evaluation. Samples No. B1 to B4 and B8 to B11 shown in Table 2 were obtained by finely pulverizing the ingot using a wet bead mill, and samples No. B5 to B7 and B12 to B14 were obtained by finely pulverizing the ingot using an ACM pulverizer.

As an alloy of a comparative example, an alloy of $MmNi_{4.0}Co_{0.4}Mn_{0.3}Al_{0.3}$ (sample No. BZ) was melted, heat-treated, and roughly pulverized in the same manner as described above. Then, this alloy was finely pulverized using a bead mill into fine powder with a particle size D50 by mass of 11.2 μm to obtain a sample (negative-electrode active material) for cell evaluation. Here, Mm is a mixture of rare earth elements composed 25% of La, 50% of Ce, 5% of Pr, and 20% of Nd, all by mass.

As a result of X-ray diffraction performed on the obtained samples, it was confirmed that the main phases of the alloys of samples No. B1 to B14 had an $A_2B_7$-type crystal structure, and that the main phase of the alloy of sample No. BZ that is the comparative example had an $AB_5$-type crystal structure.

TABLE 2

| Sample No. | Particle size distribution (by mass) | | Electrode characteristics | | Remarks |
|---|---|---|---|---|---|
| | D50 (μm) | D90 (μm) | Discharge capacity (relative to sample BZ) | Cycle life characteristic (relative to sample BZ) | |
| B1 | 3.4 | 8.8 | 1.26 | 1.18 | Inventive example |
| B2 | 6.0 | 11.1 | 1.28 | 1.20 | Inventive example |
| B3 | 9.9 | 22.2 | 1.29 | 1.23 | Inventive example |
| B4 | 13.4 | 28.9 | 1.29 | 1.22 | Inventive example |
| B5 | 15.3 | 35.3 | 1.29 | 1.23 | Inventive example |
| B6 | 17.6 | 36.8 | 1.30 | 1.24 | Inventive example |
| B7 | 19.8 | 40.2 | 1.29 | 1.20 | Inventive example |
| B8 | 3.7 | 9.0 | 1.27 | 1.24 | Inventive example |
| B9 | 6.3 | 11.5 | 1.29 | 1.26 | Inventive example |
| B10 | 9.7 | 21.6 | 1.31 | 1.28 | Inventive example |
| B11 | 13.0 | 27.0 | 1.31 | 1.28 | Inventive example |
| B12 | 15.0 | 34.1 | 1.32 | 1.27 | Inventive example |
| B13 | 17.4 | 36.4 | 1.32 | 1.25 | Inventive example |
| B14 | 19.8 | 40.0 | 1.31 | 1.23 | Inventive example |
| BZ | 11.2 | 20.8 | 1.00 | 1.00 | Comparative Example (reference) |

(Production of Evaluation Cells and Evaluation of Cell Characteristics)

Next, using the samples for cell evaluation prepared as described above, evaluation cells were produced in the same manner as in Example 1, and the cell characteristics (the discharge capacity and the cycle life characteristic) were evaluated in the same manner as in Example 1. The results were relatively evaluated, as in Example 1, using the measured value of alloy sample No. BZ that is the comparative example as a reference value (1.00). The result is included in Table 2.

As is clear from Table 2, compared with sample No. BZ that is the comparative example serving as a reference, samples No. B1 to B14 that comply with the present invention are excellent with all the evaluation values 1.10 or higher for the discharge capacity and the cycle life characteristic.

Example 3

(Production of Negative-Electrode Active Material)

A hydrogen storage alloy (samples No. C1 and C2) having an element composition of $(La_{0.80}Sm_{0.20})_{0.80}Mg_{0.20}Ni_{3.31}Al_{0.07}$ was melted using a high-frequency induction heating furnace, which had been vacuumed once, in an argon atmosphere (Ar: 100 vol %, 0.1 MPa) and cast to obtain an ingot. Then, this ingot was subjected to heat treatment of holding it in an argon atmosphere (Ar: 90 vol %, 0.1 MPa) at 1000° C. (the alloy's melting point $T_m$ minus 50° C.) for ten hours. Thereafter, the ingot was roughly pulverized, and then finely pulverized to a particle size D50 by mass of 13.4 μm using a wet bead mill. Further, a hydrogen storage alloy (samples No. C3 and C4) having an element composition of $(La_{0.95}Sm_{0.05})_{0.75}Mg_{0.25}Ni_{3.31}Al_{0.08}Cr_{0.01}$ was melted using a high-frequency induction heating furnace, which had been vacuumed once, in an argon atmosphere (Ar: 90 vol %, 0.15 MPa) and cast to obtain an ingot. Then, this ingot was subjected to heat treatment of holding it in an argon atmosphere (Ar: 100 vol %, 0.5 MPa) at 930° C. (the alloy's melting point $T_m$ minus 20° C.) for ten hours. Thereafter, the ingot was roughly pulverized, and then finely pulverized to a particle size D50 by mass of 13.4 μm using a wet bead mill.

Then, surface treatment by the following two standards was performed on these finely pulverized alloy powders to obtain samples (negative-electrode active materials) for cell evaluation.

Alkali treatment: immersing the alloy in a 75° C. aqueous sodium hydroxide containing 40 mass % of NaOH, under the condition of a solid to liquid ratio of 1:2, for two hours (samples No. C1 and C3)

Acid treatment: immersing the alloy in a 30° C. aqueous hydrochloric acid solution with a concentration of 1 mol/L, under the condition of a solid to liquid ratio of 1:1, for two hours (samples No. C2 and C4)

(Production of Evaluation Cells and Evaluation of Cell Characteristics)

Next, using the samples for cell evaluation prepared as described above, evaluation cells were produced in the same manner as in Example 1, and the cell characteristics (the discharge capacity and the cycle life characteristic) were evaluated in the same manner as in Example 1. The results were relatively evaluated using, as a reference value (1.00), the measured value of alloy sample No. BZ (not surface-treated) that is used as the comparative example in Example 2. The result is shown in Table 3.

TABLE 3

| Sample No. | Discharge capacity (relative to sample BZ) | Cycle life characteristic (relative to sample BZ) | Remarks |
|---|---|---|---|
| C1 | 1.26 | 1.29 | Inventive example |
| C2 | 1.22 | 1.36 | Inventive example |

TABLE 3-continued

| Sample No. | Discharge capacity (relative to sample BZ) | Cycle life characteristic (relative to sample BZ) | Remarks |
| --- | --- | --- | --- |
| C3 | 1.27 | 1.33 | Inventive example |
| C4 | 1.24 | 1.38 | Inventive example |
| BZ | 1.00 | 1.00 | Comparative Example (reference) |

A comparison between Table 3 and Table 2 shows that performing surface treatment on the hydrogen storage alloys of the present invention significantly improves their cycle life characteristics.

Example 4

(Production of Negative-Electrode Active Material)

A hydrogen storage alloy having an element composition of $(La_{0.80}Sm_{0.20})_{0.80}Mg_{0.20}Ni_{3.31}Al_{0.09}$ was melted using a high-frequency induction heating furnace, which had been vacuumed once, in an argon atmosphere (Ar: 90 vol %, 0.15 MPa) and cast to obtain an ingot. Then, this ingot was subjected to heat treatment of holding it in an argon atmosphere (Ar: 100 vol %, 0.5 MPa) at 1000° C. (the alloy's melting point $T_m$ minus 50° C.) for ten hours. Thereafter, the ingot was roughly pulverized, and then finely pulverized to particle sizes D50 by volume of 7.5, 10.3, 12.0, 14.1, and 15.8 μm using a wet bead mill. Then, the obtained powders were subjected to alkali treatment using an aqueous sodium hydroxide containing 40 mass % of sodium hydroxide so as to make their mass saturation magnetizations nearly equal. The mass saturation magnetizations after the alkali treatment were 4.9, 4.5, 4.5, 4.7, and 4.5 emu/g, respectively. Similarly, the ingot was finely pulverized to particle sizes D50 by volume of 14.6, 14.6, and 14.7 μm using a wet bead mill. Then, alkali treatment was performed with the alkali treatment temperature changed such that the mass saturation magnetizations became 3.4, 4.2, and 5.0 emu/g. In the present invention, a mass saturation magnetization in a state after alkali treatment and before charge and discharge is referred to as an initial saturation magnetization. After the heat treatment, X-ray diffraction measurement was performed on the pulverized powders, and it was confirmed that the main phase of each alloy was an $A_2B_7$ phase.

(Production of Evaluation Cells)
<Negative Electrode>

The negative-electrode active material prepared as described above, powder of conductive carbon black (ketjen black; KB) as a conductive assistant, two binders (styrene-butadiene rubber (SBR) and carboxymethyl cellulose (CMC)), and $Y_2O_3$ were mixed to a ratio by weight of negative-electrode active material:KB:SBR:CMC:$Y_2O_3$=94.5:0.5:1.0:1.0:3.0 and kneaded into a pasty composition. As a negative-electrode collector, a 65 μm-thick nickel foil was prepared. The pasty composition was applied to the nickel foil, dried at 80° C., and then roll-pressed under a load of 15 kN to obtain a negative electrode.

<Positive Electrode>

Nickel hydroxide $(Ni(OH)_2)$ coated with a cobalt oxyhydroxide layer containing sodium as a positive-electrode active material, metallic cobalt (Co) as a conductive assistant, two binders (acrylic resin emulsion and carboxymethyl cellulose (CMC)), and $Y_2O_3$ were mixed to a ratio by mass of positive-electrode active material:Co:SBR:CMC:$Y_2O_3$=96.5:1.0:1.0:1.0:0.5 and kneaded into a pasty composition. As a positive-electrode collector, a 65 μm-thick nickel foil was prepared. The pasty composition was applied to the nickel foil, dried at 80° C., and then roll-pressed under a load of 15 kN to obtain a positive electrode.

<Electrolytic Solution>

As the electrolytic solution, an alkaline solution containing potassium hydroxide (KOH), sodium hydroxide (NaOH), lithium hydroxide (LiOH), and tungsten trioxide $(WO_3)$ at concentrations of 5.4 mol/L, 0.8 mol/L, 0.5 mol/L, and 0.01 mol/L, respectively, was used.

<Separator>

As the separator, a sulfonated 138 μm-thick non-woven fabric made of polyolefin fibers was prepared.

<Evaluation Cells>

The separator was sandwiched between the positive electrode and the negative electrode to form an electrode plate group. This electrode plate group was disposed inside a resin casing, the above-described electrolytic solution was poured into the casing, and then the casing was hermetically closed. Thus, a cell was produced to be used for an evaluation test. Here, the capacity ratio between the working electrode and the counter electrode was adjusted to working electrode: counter electrode=1:2.

(Evaluation of Cell Characteristics)

The evaluation test of evaluation cells based on the alloys obtained as described above was performed by the following procedure.

(1) Discharge Reserve Capacity

Using the above-described evaluation cells, charge-discharge cycles that were respectively equivalent to driving an actual vehicle 50,000 km and 100,000 km were performed at 55° C. Then, the temperature was changed to 25° C. and a filling port of the evaluation cell that had been discharged was opened. The cell was discharged at a current value of 3C for 30 minutes, with the end voltage set to −1.99 V, and the discharge reserve capacity was measured. The reason for opening the filling port of the evaluation cell is to let the gas generated during discharge out of the evaluation cell.

Here, the discharge reserve capacity refers to a capacity of the negative electrode remaining when the battery has been completely discharged within a range normally used for charge and discharge.

Figure 2:
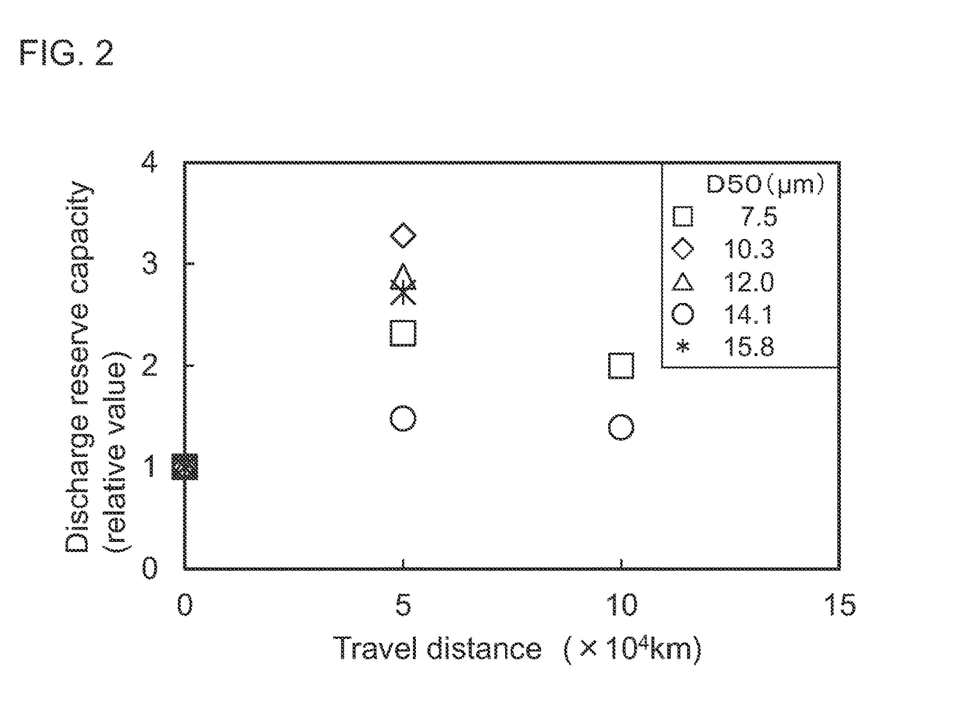
FIG. 2 is a graph showing how the particle size of the hydrogen storage alloy of the present invention influences the discharge reserve capacity, after a cycle test, of an alkaline storage battery that uses the alloy.

In FIG. 2, the discharge reserve capacities of the alloys with particle sizes D50 by volume of 7.5, 10.3, 12.0, 14.1, and 15.8 μm after the charge-discharge cycle test are plotted as ratios to their discharge reserve capacities before the charge-discharge cycle test.

(2) Corrosion Resistance of Hydrogen Storage Alloy Powders

As with the measurement of the discharge reserve capacity described above, charge-discharge cycles respectively equivalent to driving an actual vehicle 50,000 km and 100,000 km were performed at 55° C. Then, the evaluation cell was disassembled and retrieved with the alloy powder as the negative-electrode active material still attached to the negative-electrode collector. After being washed with water three times, the negative electrode was dried at 80° C., and the hydrogen storage alloy as the negative-electrode active material was peeled off and sampled from the negative-electrode collector. The mass saturation magnetization (emu/g) of the obtained hydrogen storage alloy powder was measured using a vibrating sample magnetometer VSM-5-15 (manufactured by Toei Industry). For the measurement, 0.2 g of the hydrogen storage alloy powder was weighed and placed in a sample holder and then subjected to a magnetic field of 10 kOe.

Figure 3:
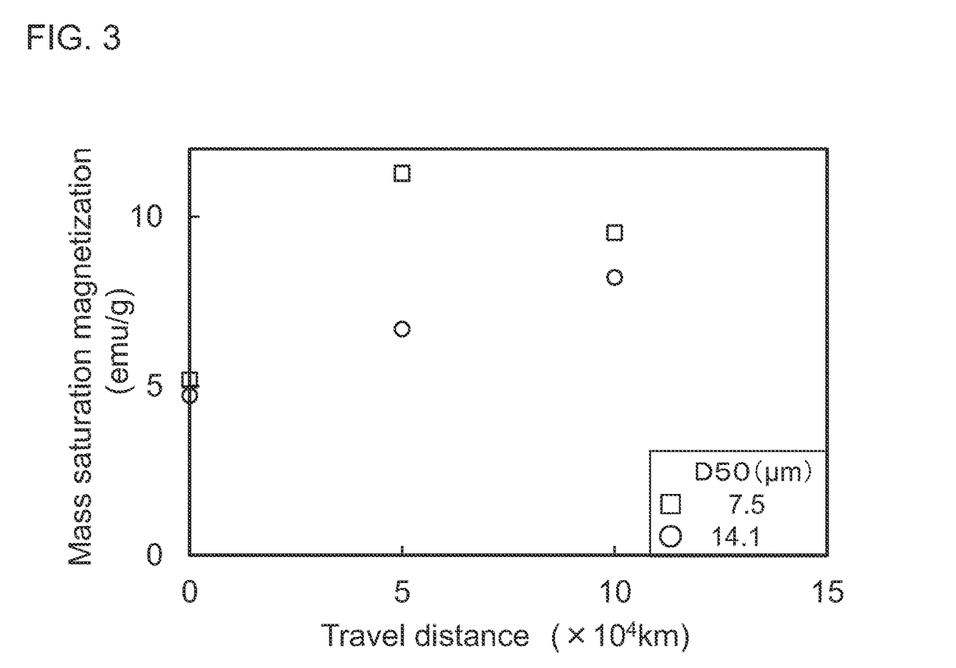
FIG. 3 is a graph showing how the particle size of the hydrogen storage alloy of the present invention influences the mass saturation magnetization, after a cycle test, of an alkaline storage battery that uses the alloy.
Figure 4:
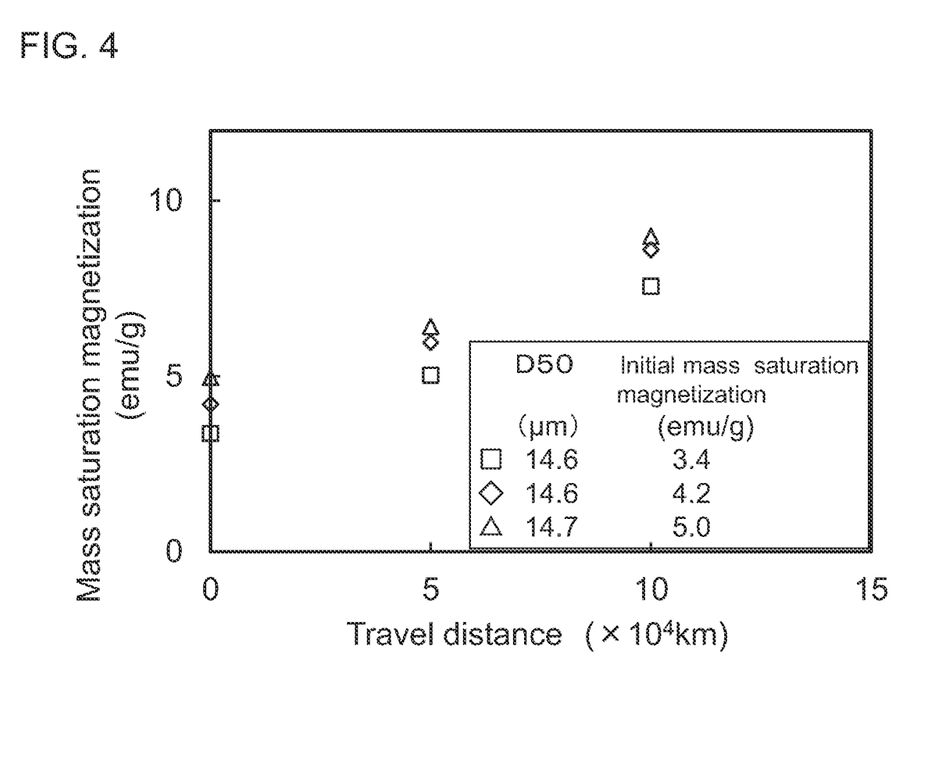
FIG. 4 is a graph showing how the initial mass saturation magnetization of the hydrogen storage alloy of the present invention influences the mass saturation magnetization, after a cycle test, of an alkaline storage battery that uses the alloy.

FIG. 3 shows changes in mass saturation magnetization resulting from the cycle test of the alloys with particle sizes D50 by volume of 7.5 and 14.1 μm, and FIG. 4 shows changes in mass saturation magnetization resulting from a cycle test of three hydrogen storage alloys that have the same particle size but differ from one another in initial mass saturation magnetization.

(Evaluation Result)

When the discharge reserve capacity increases, the charge reserve capacity (the capacity of the negative electrode by which it can be charged after the battery is fully charged) decreases, which increases the likelihood of generation of a gas toward the end of charge. Therefore, a smaller increase in the discharge reserve capacity is preferable. If the increase in the discharge reserve capacity is small, a balance can be achieved between the charge reserve and the discharge reserve that are secured in advance, and it becomes less likely that either one may be exhausted. As can be seen from the result in FIG. 2, the performance of the hydrogen storage alloy with a particle size D50 by volume of 14.1 μm is excellent.

When the negative-electrode active material corrodes, Al seeps into the alkaline solution, and as La and Mg form hydroxide, consequently the fraction of Ni increases and the magnetization rises. Therefore, corrosion is considered to have progressed further when the value of the mass saturation magnetization is larger. As can be seen from the result in FIG. 3, the hydrogen storage alloy with a particle size D50 by volume of 14.1 μm undergoes a smaller increase in mass saturation magnetization than the hydrogen storage alloy with a particle size of 7.5 μm, and thus corrosion of the former is mitigated. Further, as can be seen from the result in FIG. 4, the difference in initial mass saturation magnetization is still retained after the charge-discharge cycle test.

Example 5

(Production of Negative-Electrode Active Material)

A hydrogen storage alloy having an element composition of $(La_{0.80}Sm_{0.20})_{0.80}Mg_{0.20}Ni_{3.31}Al_{0.09}$ was melted using a high-frequency induction heating furnace, which has been vacuumed once, in an argon atmosphere (Ar: 90 vol %, 0.15 MPa) and cast to obtain an ingot. Then, this ingot was subjected to heat treatment of holding it in an argon atmosphere (Ar: 100 vol %, 0.5 MPa) at 1000° C. (the alloy's melting point $T_m$ minus 50° C.) for ten hours. Thereafter, the ingot was roughly pulverized, and then finely pulverized using a wet bead mill. Then, the obtained powders were subjected to alkali treatment using an aqueous sodium hydroxide containing 40 mass % of sodium hydroxide so as to make their mass saturation magnetizations nearly equal. Thus, negative-electrode active materials of samples No. D1 to D12 were manufactured. Table 4 shows the average particle sizes D50 by volume and the mass saturation magnetizations (initial saturation magnetizations) after the alkaline treatment of the negative-electrode active materials of samples No. D1 to D12.

After the heat treatment, X-ray diffraction measurement was performed on the pulverized powders, and it was confirmed that the main phase of each alloy was an $A_2B_7$ phase.

(Production of Evaluation Cells)

<Negative Electrode>

The negative-electrode active material prepared as described above, powder of conductive carbon black (ketjen black; KB) as a conductive assistant, two binders (styrene-butadiene rubber (SBR) and carboxymethyl cellulose (CMC)), and $Y_2O_3$ were mixed to a ratio by weight of negative-electrode active material:KB:SBR:CMC:$Y_2O_3$=94.5:0.5:1.0:1.0:3.0 and kneaded into a pasty composition. As a negative-electrode collector, a 65 μm-thick nickel foil was prepared. The pasty composition was applied to the nickel foil, dried at 80° C., and then roll-pressed under a load of 15 kN to obtain a negative electrode.

<Positive Electrode>

Nickel hydroxide ($Ni(OH)_2$) coated with a cobalt oxyhydroxide layer containing sodium as a positive-electrode active material, metallic cobalt (Co) as a conductive assistant, two binders (acrylic resin emulsion and carboxymethyl cellulose (CMC)), and $Y_2O_3$ were mixed to a ratio by mass of positive-electrode active material:Co:SBR:CMC:$Y_2O_3$=96.5:1.0:1.0:1.0:0.5 and kneaded into a pasty composition. As a positive-electrode collector, a 65 μm-thick nickel foil was prepared. This pasty composition was applied to the nickel foil, dried at 80° C., and then roll-pressed under a load of 15 kN to obtain a positive electrode.

<Electrolytic Solution>

As the electrolytic solution, an alkaline solution containing potassium hydroxide (KOH), sodium hydroxide (NaOH), lithium hydroxide (LiOH), and tungsten trioxide ($WO_3$) at concentrations of 5.4 mol/L, 0.8 mol/L, 0.5 mol/L, and 0.01 mol/L, respectively, was used.

<Separator>

As the separator, a sulfonated 138 μm-thick non-woven fabric made of polyolefin fibers was prepared.

<Evaluation Cells>

The separator was sandwiched between the positive electrode and the negative electrode to form an electrode plate group. This electrode plate group was disposed inside a resin casing, the electrolytic solution was poured into the casing, and then the casing was hermetically closed. Thus, a cell was produced to be used for an evaluation test. Here, the capacity ratio between the working electrode and the counter electrode was adjusted to working electrode:counter electrode=1:2.

(Evaluation of Cell Characteristics)

The evaluation test of the evaluation cells based on the alloys obtained as described above was performed by the following procedure.

Discharge Resistance

After being activated by 24 charge-discharge cycles at 25° C., the cell was adjusted to an SOC of 60% and discharged at the rate of 1C for 5 seconds at a temperature of 25° C. From the amount of change in voltage resulting from the discharge and the current value at the time of the discharge, the discharge resistance value of each nickel-metal hydride battery was calculated based on Ohm's law. The result is shown in Table 4.

TABLE 4

| Sample No. | Initial mass saturation magnetization [emu/g] | D50 (by volume) [μm] | Discharge resistance [Ω] |
| --- | --- | --- | --- |
| D1 | 4.4 | 7.0 | 0.130 |
| D2 | 4.4 | 7.5 | 0.135 |
| D3 | 4.4 | 8.0 | 0.137 |
| D4 | 4.4 | 8.6 | 0.131 |
| D5 | 4.4 | 9.0 | 0.130 |
| D6 | 4.4 | 9.5 | 0.135 |
| D7 | 4.4 | 10.3 | 0.128 |
| D8 | 4.5 | 12.0 | 0.132 |
| D9 | 4.5 | 14.1 | 0.128 |
| D10 | 4.4 | 15.8 | 0.132 |

TABLE 4-continued

| Sample No. | Initial mass saturation magnetization [emu/g] | D50 (by volume) [μm] | Discharge resistance [Ω] |
|---|---|---|---|
| D11 | 4.7 | 14.2 | 0.132 |
| D12 | 4.7 | 16.0 | 0.134 |

As the result in Table 4 shows, no major influence of the variation in the particle size D50 by volume on the discharge resistance was observed.

Example 6

(Production of Negative-Electrode Active Material)

A hydrogen storage alloy having an element composition of $(La_{0.80}Sm_{0.20})_{0.80}Mg_{0.20}Ni_{3.31}Al_{0.09}$ was melted using a high-frequency induction heating furnace, which had been vacuumed once, in an argon atmosphere (Ar: 90 vol %, 0.15 MPa) and cast to obtain an ingot. Then, this ingot was subjected to heat treatment of holding it in an argon atmosphere (Ar: 100 vol %, 0.5 MPa) at 1000° C. (the alloy's melting point $T_m$ minus 50° C.) for ten hours. Thereafter, the ingot was roughly pulverized, and then finely pulverized using a wet bead mill. Then, the obtained powders were subjected to alkali treatment using an aqueous sodium hydroxide containing 40 mass % of sodium hydroxide. Thus, negative-electrode active materials of samples No. E1 to E7 were manufactured. Table 5 shows the average particle sizes D50 by volume and the mass saturation magnetizations (initial saturation magnetizations) after the alkaline treatment of the negative-electrode active materials of samples No. E1 to E7.

After the heat treatment, X-ray diffraction measurement was performed on the pulverized powders, and it was confirmed that the main phase of each alloy was an $A_2B_7$ phase.

(Production of Evaluation Cells)
<Negative Electrode>

The negative-electrode active material prepared as described above, powder of conductive carbon black (ketjen black; KB) as a conductive assistant, two binders (styrene-butadiene rubber (SBR) and carboxymethyl cellulose (CMC)), and $Y_2O_3$ were mixed to a ratio by weight of negative-electrode active material:KB:SBR:CMC:$Y_2O_3$=94.5:0.5:1.0:1.0:3.0 and kneaded into a pasty composition. As a negative-electrode collector, a 65 μm-thick nickel foil was prepared. The pasty composition was applied to the nickel foil, dried at 80° C., and then roll-pressed under a load of 15 kN to obtain a negative electrode.

<Positive Electrode>

Nickel hydroxide $(Ni(OH)_2)$ coated with a cobalt oxyhydroxide layer containing sodium as a positive-electrode active material, metallic cobalt (Co) as a conductive assistant, two binders (acrylic resin emulsion and carboxymethyl cellulose (CMC)), and $Y_2O_3$ were mixed to a ratio by mass of positive-electrode active material:Co:SBR:CMC:$Y_2O_3$=96.5:1.0:1.0:1.0:0.5 and kneaded into a pasty composition. As a positive-electrode collector, a 65 μm-thick nickel foil was prepared. The pasty composition was applied to the nickel foil, dried at 80° C., and then roll-pressed under a load of 15 kN to obtain a positive electrode.

<Electrolytic Solution>

As the electrolytic solution, an alkaline solution containing potassium hydroxide (KOH), sodium hydroxide (NaOH), lithium hydroxide (LiOH), and tungsten trioxide $(WO_3)$ at concentrations of 5.4 mol/L, 0.8 mol/L, 0.5 mol/L, and 0.01 mol/L, respectively, was used.

<Separator>

As the separator, a sulfonated 138 μm-thick non-woven fabric made of polyolefin fibers was prepared.

<Evaluation Cells>

The separator was sandwiched between the positive electrode and the negative electrode to form an electrode plate group. This electrode plate group was disposed inside a resin casing, the electrolytic solution was poured into the casing, and then the casing was hermetically closed. Thus, a cell was produced to be used for an evaluation test. Here, the capacity ratio between the working electrode and the counter electrode was adjusted to working electrode:counter electrode=1:2.

(Evaluation of Cell Characteristics)

The evaluation test of the evaluation cells based on the alloys obtained as described above was performed by the following procedure.

<Discharge Resistance>

After being activated by 24 charge-discharge cycles at 25° C., the cells were adjusted to an SOC of 60% and discharged at the rate of 1C for 5 seconds at a temperature of 25° C. From the amount of change in voltage resulting from the discharge and the current value at the time of the discharge, the discharge resistance value of each nickel-metal hydride battery was calculated based on Ohm's law. The result is shown in Table 5.

TABLE 5

| Sample No. | Initial mass saturation magnetization [emu/g] | D50 (by volume) [μm] | Discharge resistance [Ω] |
|---|---|---|---|
| E1 | 2.4 | 14.1 | 0.165 |
| E2 | 2.9 | 13.6 | 0.152 |
| E3 | 3.3 | 14.2 | 0.147 |
| E4 | 3.2 | 14.6 | 0.152 |
| E5 | 4.0 | 14.6 | 0.147 |
| E6 | 4.7 | 14.7 | 0.152 |
| E7 | 8.3 | 12.4 | 0.173 |

As shown in Table 5, a decrease in discharge resistance was observed in samples No. E2 to E6. Based on the results in FIG. 2, FIG. 3, Table 4, and Table 5, the average particle size D50 by volume of the hydrogen storage alloy of the present invention is preferably 10 μm or larger and 20 μm or smaller, further preferably 12 μm or larger and 18 μm or smaller, and most preferably 13 μm or larger and 17 μm or smaller. The initial mass saturation magnetization of the hydrogen storage alloy of the present invention is preferably 2.5 emu/g or higher and 6.0 emu/g or lower, further preferably 3.0 emu/g or higher and 5.4 emu/g or lower, and most preferably 3.2 emu/g or higher and 5.0 emu/g or lower.

INDUSTRIAL APPLICABILITY

The hydrogen storage alloy of the present invention is superior to conventionally used $AB_5$-type hydrogen storage alloys both in the discharge capacity and the cycle life characteristic. Therefore, this hydrogen storage alloy is not only suitable as a material for a negative electrode of an alkaline storage battery used for a hybrid electric vehicle or an automobile having a start-stop function, but can also be suitably used for an alkaline storage battery of a pure electric vehicle.

REFERENCE SIGNS LIST

1: Positive electrode
2: Negative electrode
3: Separator
4: Casing (battery case)
10: Alkaline storage battery

The invention claimed is:

1. A hydrogen storage alloy for an alkaline storage battery that is a hydrogen storage alloy used for an alkaline storage battery, wherein a main phase of the hydrogen storage alloy has a crystal structure of an $A_2B_7$-type structure, and that the hydrogen storage alloy is represented by the following general formula (1):

$$(La_{1-a}Sm_a)_{1-b}Mg_bNi_cAl_dCr_e \qquad (1),$$

wherein suffixes a, b, c, d, and e meet the following conditions:

$0 \leq a \leq 0.35;$ $0.15 \leq b \leq 0.30;$ $0.02 \leq d < 0.10;$ $0 \leq e \leq 0.10;$ $3.20 \leq c+d+e \leq 3.50;$ and $0 < a+e.$ 2. The hydrogen storage alloy for an alkaline storage battery according to claim 1, wherein the hydrogen storage alloy has a particle size D50 by mass of 3 μm or larger and 20 μm or smaller.

3. The hydrogen storage alloy for an alkaline storage battery according to claim 1, wherein the hydrogen storage alloy has a particle size D90 by mass of 8 μm or larger and 50 μm or smaller.

4. The hydrogen storage alloy for an alkaline storage battery according to claim 1, wherein the hydrogen storage alloy has a particle size D50 by volume of 10 μm or larger and 20 μm or smaller and an initial mass saturation magnetization of 2.5 emu/g or higher and 6.0 emu/g or lower.

5. The hydrogen storage alloy for an alkaline storage battery according to claim 1, wherein the hydrogen storage alloy has a layer composed of Ni on at least part of particle surfaces.

6. The hydrogen storage alloy for an alkaline storage battery according to claim 5, wherein the layer composed of Ni is an alkali-treated layer or an acid-treated layer.

7. The hydrogen storage alloy for an alkaline storage battery according to claim 2, wherein the hydrogen storage alloy has a particle size D90 by mass of 8 μm or larger and 50 μm or smaller.

8. The hydrogen storage alloy for an alkaline storage battery according to claim 2, wherein the hydrogen storage alloy has a layer composed of Ni on at least part of particle surfaces.

9. The hydrogen storage alloy for an alkaline storage battery according to claim 3, wherein the hydrogen storage alloy has a layer composed of Ni on at least part of particle surfaces.

10. The hydrogen storage alloy for an alkaline storage battery according to claim 4, wherein the hydrogen storage alloy has a layer composed of Ni on at least part of particle surfaces.

11. The hydrogen storage alloy for an alkaline storage battery according to claim 7, wherein the hydrogen storage alloy has a layer composed of Ni on at least part of particle surfaces.

12. The hydrogen storage alloy for an alkaline storage battery according to claim 8, wherein the layer composed of Ni is an alkali-treated layer or an acid-treated layer.

13. The hydrogen storage alloy for an alkaline storage battery according to claim 9, wherein the layer composed of Ni is an alkali-treated layer or an acid-treated layer.

14. The hydrogen storage alloy for an alkaline storage battery according to claim 10, wherein the layer composed of Ni is an alkali-treated layer or an acid-treated layer.

15. The hydrogen storage alloy for an alkaline storage battery according to claim 11, wherein the layer composed of Ni is an alkali-treated layer or an acid-treated layer.

16. An alkaline storage battery using the hydrogen storage alloy according to claim 1 as a negative electrode, wherein the alkaline storage battery is installed in a hybrid electric vehicle having a motor as a driving source and supplies electricity to the motor or
the alkaline storage battery is installed in an automobile that has a start-stop function with an engine started by a starter motor and supplies electricity to the starter motor.

17. A vehicle wherein the vehicle has, as an electricity supply source for a motor, an alkaline storage battery that uses the hydrogen storage alloy claim 1 as a negative electrode.

* * * * *